US008160262B2

(12) United States Patent
Buck et al.

(10) Patent No.: US 8,160,262 B2
(45) Date of Patent: Apr. 17, 2012

(54) METHOD FOR DEREVERBERATION OF AN ACOUSTIC SIGNAL

(75) Inventors: Markus Buck, Biberach (DE); Arthur Wolf, Neu-Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 827 days.

(21) Appl. No.: 12/263,227

(22) Filed: Oct. 31, 2008

(65) Prior Publication Data

US 2009/0117948 A1 May 7, 2009

(30) Foreign Application Priority Data

Oct. 31, 2007 (EP) .................................... 07021334

(51) Int. Cl.
*H04B 1/38* (2006.01)

(52) U.S. Cl. ............................... 381/66; 381/63; 381/92

(58) Field of Classification Search .................... 381/66, 381/92, 63
See application file for complete search history.

(56) References Cited

U.S. PATENT DOCUMENTS

| | | | | |
|---|---|---|---|---|
| 8,019,454 | B2 * | 9/2011 | Haulick et al. | 700/94 |
| 8,036,715 | B2 * | 10/2011 | Buck et al. | 455/569.2 |
| 8,036,767 | B2 * | 10/2011 | Soulodre | 700/94 |
| 2004/0037418 | A1 * | 2/2004 | Kramer | 379/406.02 |
| 2007/0135061 | A1 * | 6/2007 | Buck et al. | 455/73 |
| 2008/0031471 | A1 * | 2/2008 | Haulick et al. | 381/86 |
| 2008/0069366 | A1 * | 3/2008 | Soulodre | 381/63 |
| 2008/0071400 | A1 * | 3/2008 | Haulick et al. | 700/94 |
| 2008/0262849 | A1 * | 10/2008 | Buck et al. | 704/275 |
| 2008/0292108 | A1 * | 11/2008 | Buck et al. | 381/63 |
| 2009/0117948 | A1 * | 5/2009 | Buck et al. | 455/570 |
| 2009/0248403 | A1 * | 10/2009 | Kinoshita et al. | 704/219 |
| 2010/0014690 | A1 * | 1/2010 | Wolff et al. | 381/92 |
| 2010/0150375 | A1 * | 6/2010 | Buck et al. | 381/94.1 |
| 2010/0246844 | A1 * | 9/2010 | Wolff et al. | 381/66 |
| 2011/0019835 | A1 * | 1/2011 | Schmidt et al. | 381/71.11 |

FOREIGN PATENT DOCUMENTS

| | | | |
|---|---|---|---|
| EP | 1885154 A1 * | 2/2008 | |
| EP | 2058804 A1 * | 5/2009 | |
| EP | 2237271 A1 * | 10/2010 | |
| WO | WO 2006/011104 A1 | 2/2006 | |

OTHER PUBLICATIONS

Lebart, et al.; A New Method Based on Spectral Subtraction for Speech Reveberation; ACTA Acustica; vol. 87; 2001; pp. 359-366.

Unoki, et al.; A Method Based on the MTF Concept for Dereverberating the Power Envelope from the Reverberant Signal; School of Information Science, Japan Advanced Institute of Science and Technology, Ishikawa, Japan; pp. 888-891.

Hansler, et al.; Acoustic Echo and Noise Control—A Practical Approach; John Wiley & Sons, Hoboken, New Jersey, USA, 2004.

* cited by examiner

*Primary Examiner* — Laura Menz

(74) *Attorney, Agent, or Firm* — Sunstein Kann Murphy & Timbers LLP

(57) ABSTRACT

A method is provided for estimating a reverberation signal component of an acoustic signal detected by a microphone where the acoustic signal is comprised of a direct sound component and a reverberation signal component. A method for dereverberation of an acoustic signal is further provided.

14 Claims, 7 Drawing Sheets

300

METHOD FOR DEREVERBERATION OF AN ACOUSTIC SIGNAL

RELATED APPLICATIONS

This application claims priority of European Patent Application Serial Number 07 021 334.3, filed on Oct. 31, 2007, titled METHOD FOR DEREVERBERATION OF AN ACOUSTIC SIGNAL, which application is incorporated in its entirety by reference in this application.

BACKGROUND OF THE INVENTION

1. Field of the Invention

This invention relates to a method for estimating a reverberation signal component of an acoustic signal, a method for dereverberation of the acoustic signal and to a system therefore. The invention relates particularly to the dereverberation of a microphone signal in a room or a vehicle cabin.

2. Related Art

The enhancement of the quality of audio and speech signals in a communication system is a central topic in acoustic, and in particular, speech signal processing. The communication between two parties is often carried out in a noisy background environment and noise reduction, as well as echo compensation, is necessary to guarantee intelligibility. Prominent examples are hands-free voice communication systems in vehicles and automatic speech recognition units.

Of particular importance is the suppression of reverberation that can severely affect the quality of the audio signal. Reverberation especially impairs the performance of automatic speech recognizers. The acoustic phenomenon of reverberation can be described as follows: a sound source (e.g., a speaking person or a loudspeaker) emanates an acoustic signal that propagates through the room. After the sound reaches the microphone in a direct path, further sound from the reflection of the sound off room boundaries also reach the microphone, but with some delay. Depending on the strength of the reflections and their time delays, the speech spectrum smears over time.

Several methods for the dereverberation of microphone signals are known in the art. For example, it is attempted to reduce dereverberation by means of deconvolution, i.e., inverse filtering using an estimate for the acoustic channel. Deconvolution can be performed in the time domain or in the cepstral domain. This kind of signal processing, however, suffers from the dependence on accurate estimate of the acoustic channel which is in practical applications almost impossible. In an alternative approach, the direct path speech signal is processed by pitch enhancement or by linear predictive coding analysis. In a multi channel approach, averaging over multiple microphone signals is performed to obtain a reduction of the reverberation contribution to the processed signal. These approaches cannot, however, guarantee a sufficiently high quality of the wanted signal. In addition, implementations of the multi channel approaches are rather expensive.

Despite recent engineering processes, current dereverberation techniques are still not satisfying and reliably enough for practical applications. Accordingly, a need exists to overcome the above-mentioned drawbacks and to provide a method and a system for dereverberation exhibiting an improved dereverberation of microphone signals.

SUMMARY

A method is provided for estimating a reverberation signal component of an acoustic signal detected by a microphone.

The acoustic signal includes both direct sound component and the reverberation signal component. The estimating method includes (i) detecting the acoustic signal and (ii) estimating the reverberation signal component. The steps of estimating the reverberation signal include, (i) calculating an incorrect reverberation signal component $\tilde{R}$ under the assumption that the reverberation signal component has a predetermined relationship to the direct sound component; and (ii) minimizing the error resulting from the assumption that the reverberation signal component has a predetermined relationship to the direct sound component so as to estimate the reverberation signal component. The step of estimating the reverberation may further include attenuating the reverberation signal component in the acoustic signal.

A system is also provided for dereverberation of an acoustic signal comprised of a direct signal component and a reverberation signal component. The system includes a microphone for detecting the acoustic signal and digital filter for filtering the acoustic signal for attenuating the reverberation component. A signal processing unit is also provided for estimating the reverberation signal component. The reverberation signal component is calculated by calculating an incorrect reverberation signal component $\tilde{R}$ under the assumption that the reverberation signal component has a predetermined relationship to the direct sound component, and by minimizing the error resulting from the assumption that the reverberation signal component has a predetermined relationship to the direct sound component. In one implementation, such a system may be a hands free telephony system. In another implementation, such a system may be a sound recognition system.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
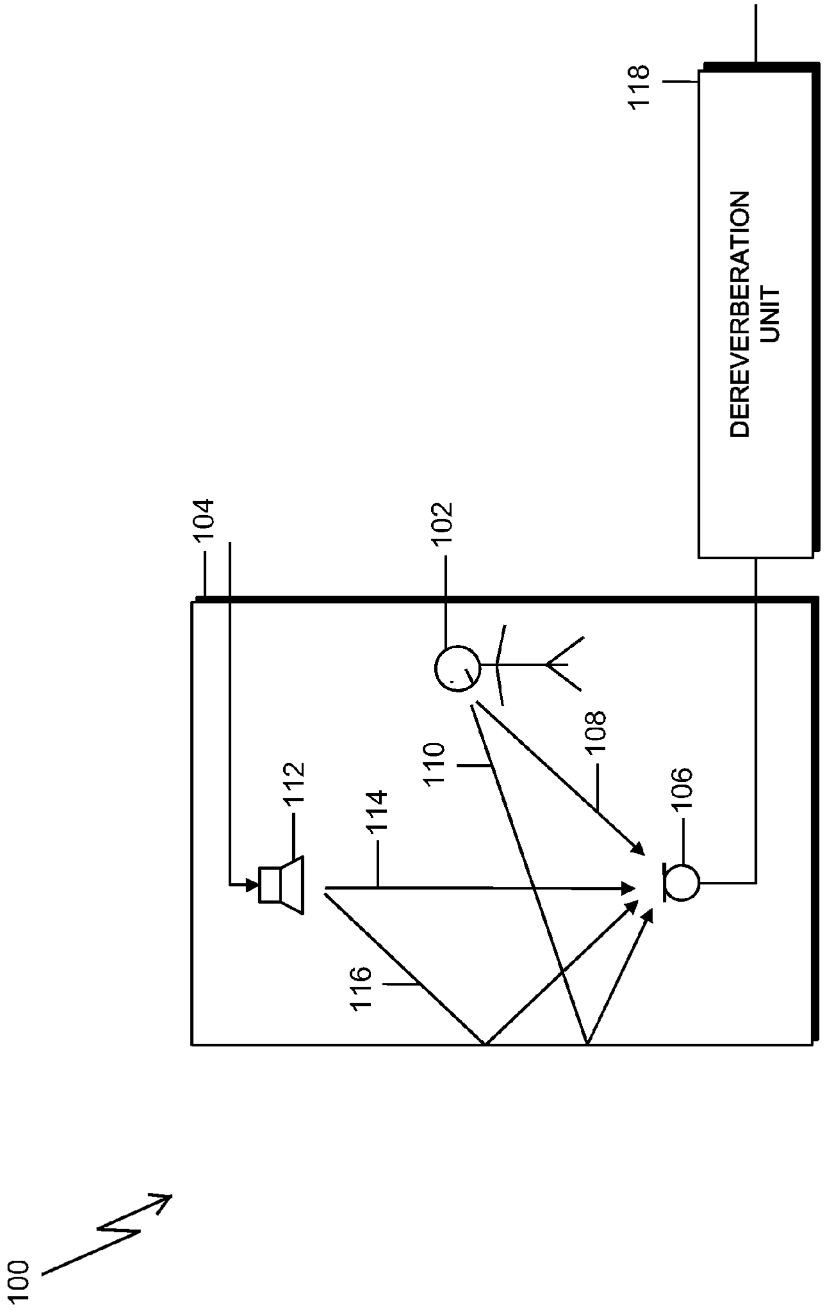
FIG. 1 is a diagram of a room illustrating the occurrence of reverberation of signal components in an acoustic signal.

FIG. 1 is a diagram of a room 100 illustrating the occurrence of reverberation of signal components in an acoustic signal. In particular, FIG. 1 shows the generation of the reverberation component of an acoustic signal emitted by a person 102 inside a room 104, which could be a vehicle cabin or any other room, as detected by a microphone 106. The acoustic signal of the speaking person 102 has a direct sound component 108 and a reverberation signal component 110 originating from the sound reflected at the room boundaries. The reflections at the wall boundaries induce a signal component resulting in a reverberant speech.

Figure 2:
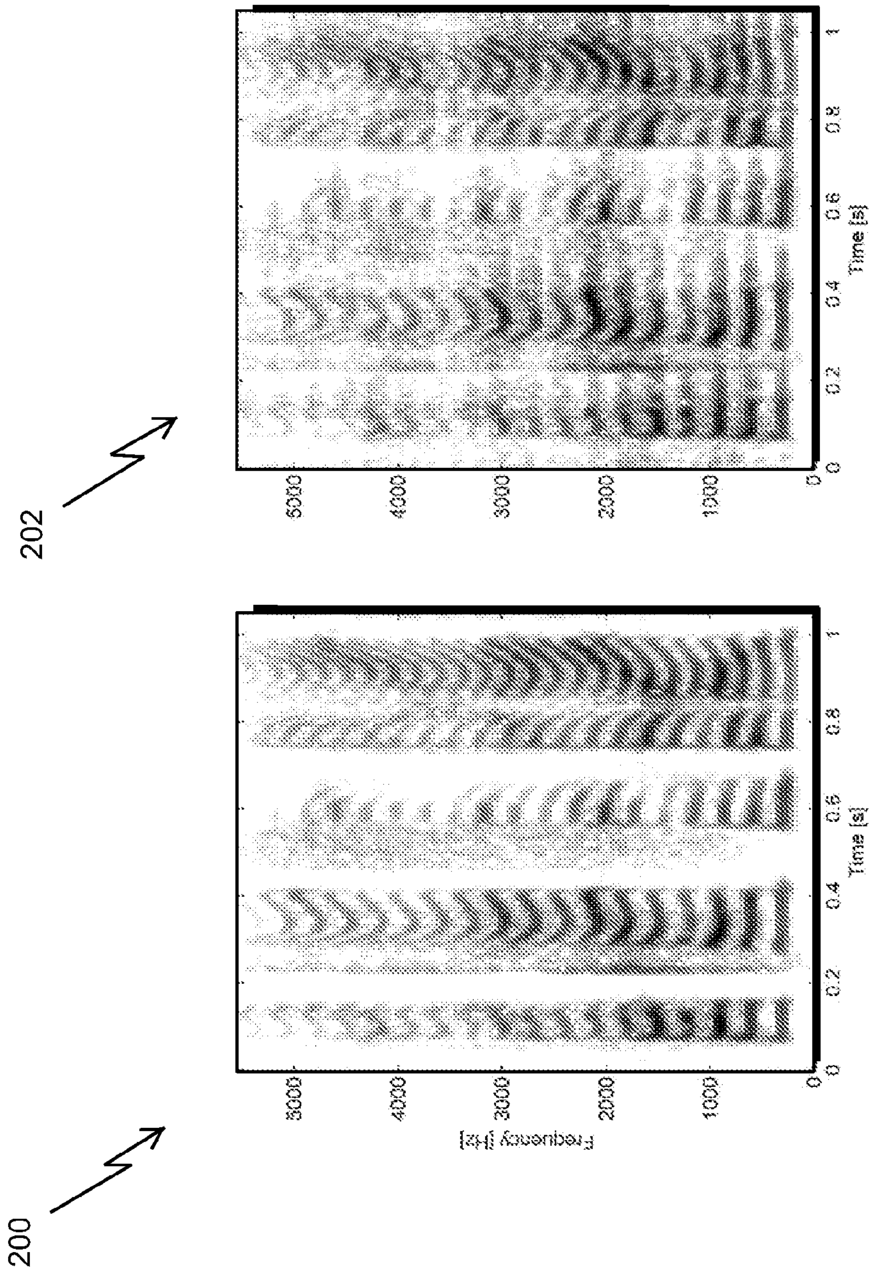
FIG. 2 illustrates two examples of spectrograms where the example on the left side is a speech signal without reverberation components, and the example on the right side is the same speech signal but with reverberation components.

FIG. 2 illustrates two examples 200 and 202 of spectrograms showing the frequency of the recorded speech over time. The spectrogram on the left side 200 is a speech signal without reverberation components, and the spectrogram on the right side 202 is the same speech signal but with reverberation components. In the right spectrogram 202 with reverberation components, the smearing over time for the reverberant speech can be seen. The reverberation is visible as a smearing in time direction.

In addition to the speaking person, a loudspeaker 112 may be provided additionally emitting an acoustic signal with a direct component 114 and a reverberation component 116. The acoustic signal picked up by the microphone 106 now has direct sound signal components 108 and reverberation signal components 110. The detected signal is transmitted to a dereverberation unit 118 that attenuates the reverberation components as will be explained in more detail below. For illustrative purposes, one model for reverberation and a time domain is explained below:

If there is a speaker 102 or a loudspeaker 112 and a microphone 106 in a closed room as shown in FIG. 1, the acoustic signal y(n) picked up by the microphone 106 can be described as $$y(n) = x_c(n) * h(n) = \sum_{l=D_t}^{\infty} x_c(n-l)h(l) \quad (4)$$

where $x_c(n)$ denotes the signal emitted by the speaker and h(n) is the room impulse response.

Figure 3:
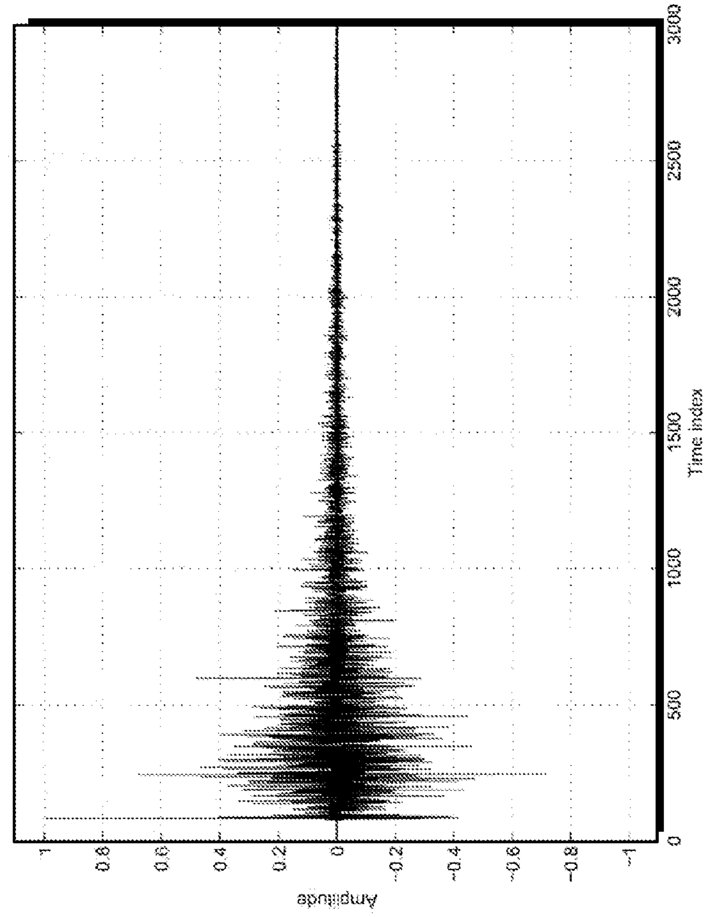
FIG. 3 illustrates an example of a room impulse response measured overtime explaining in further detail the existence of reverberation components.

FIG. 3 illustrates an example of a room impulse response measured over time 300 explaining in further detail the existence of reverberation components. The first peak illustrated in FIG. 3 corresponds to the direct path 108 from the speaker 102 to the microphone 106. The decaying tail corresponds to the late reverberation. For speech signals, only the first part of the impulse response contributes to the intelligibility. The late reverberation tail reduces intelligibility and impairs the performance of a speech recognizer. Thus, the microphone signal y(n) can be divided in a desired part x(n) corresponding to the direct signal path and to undesired or unwanted part r(n)

$$y(n)=x(n)+r(n) \quad (5)$$

The unwanted reverberant signal portion can be noted as $$r(n) = \sum_{l=D_t}^{\infty} x_c(n-l)h(l) \quad (6)$$

where $D_t$ denotes the threshold time index for the impulse response for classifying a path or reflection as wanted or unwanted.

The energy of the room impulse responds typically decays exponentially over time. The reverberation time $T_{60}$ is defined as the time the reverberation needs to decay by 60 db. A statistical model for the decay is given for dereverberation:

$$E\{h^2(n)\} = \begin{cases} 0 & \text{for } n < 0 \\ \sigma^2 e^{-2\alpha n} & \text{for } n \geq 0 \end{cases} \quad (7)$$

The energy decay is modelled with parameter $$\beta = \frac{3\ln 10}{T_{60} fs}$$

where fs denotes the sampling frequency and $\sigma^2$ is a scaling factor for the entire energy of the impulse response. The time domain signal y(n) can be transformed into the frequency domain by a short-time Fourier transform (or into sub-band signals by a filter bank, respectively) resulting in the transformed signal $Y_\mu(k)$. μ denotes the index of the frequency bin or the index of the sub-band, respectively. k denotes the frame number of the time index of the subsampled signal, respectively. According to equation 5, the resulting transformed signal can be represented by $$Y_\mu(k)=X_\mu(k)+R_\mu(k) \quad (8)$$

An (energy) filter $G_\mu(k)$ models the energy decay of the room impulse response in the frequency or sub-band domain. Thus, the energy smearing due to reverberation is modelled as $$|Y_\mu(k)|^2 \approx \sum_{l=0}^{\infty} |X_{c,\mu}(k-l)|^2 G_\mu(l) \quad (9)$$

Desired signal $X_\mu(k)$ and reverberation $R_\mu(k)$ are assumed to be uncorrelated despite this does not hold for early reverberation portions. Then the powers can be added linearly:

$$|Y_\mu(k)|^2 \approx |X_\mu(k)|^2+|R_\mu(k)|^2 \quad (10)$$

The energy decay $G_\mu(k)$ is divided in a first part containing the first D frames that contribute to the desired signal energy $|X_\mu(k)|^2$ and the succeeding rest contribute to the reverberation signal.

$$|R_\mu(k)|^2 \approx \sum_{l=D}^{\infty} |X_{c,\mu}(k-l)|^2 G_\mu(l) \quad (11)$$

Similar to the time domain model from equation (7), a constant decay of the reverberation energy is assumed:

$$G_\mu(k) = \begin{cases} 1 & \text{for } k = 0 \\ A_\mu \cdot e^{-\gamma_\mu k} & \text{for } k > 0 \end{cases} \quad (12)$$

The parameter $A_\mu$ accounts for the ratio of direct-path energy to reverberation energy. The parameter $\gamma_\mu$ describes the decay of the reverberation energy. $\gamma_\mu$ depends mainly on room parameters like room size or sound absorption at the walls, whereas $A_\mu$ depends mainly on the position of the speaker 102 relative to the microphones 106.

With the model after equation (12) a recursive formula can be obtained form equation (11):

$$\begin{aligned} |R_\mu(k)|^2 &\approx \sum_{l=D}^{\infty} |X_{c,\mu}(k-l)|^2 A_\mu e^{-\gamma_\mu l} \\ &= \sum_{m=-\infty}^{k-D} |X_{c,\mu}(m)|^2 A_\mu e^{-\gamma_\mu (k-m)} \\ &= |X_{c,\mu}(k-D)|^2 A_\mu e^{-\gamma_\mu D} + \sum_{m=-\infty}^{k-1-D} |X_{c,\mu}(m)|^2 A_\mu e^{-\gamma_\mu (k-m)} \\ &= |X_{c,\mu}(k-D)|^2 A_\mu e^{-\gamma_\mu D} + \sum_{m=-\infty}^{k-1-D} |X_{c,\mu}(m)|^2 A_\mu e^{-\gamma_\mu (k-1-m)} e^{-\gamma_\mu} \\ &= |X_{c,\mu}(k-D)|^2 A_\mu e^{-\gamma_\mu D} + |R_\mu(k-1)|^2 e^{-\gamma_\mu} \end{aligned} \quad (13)$$

With the approximation $$|X_{c,\mu}(k-D)|^2 \approx |Y_\mu(k-D)|^2 \quad (14)$$

the reverberant energy can be estimated from the delayed signal spectrum and the previous estimate of reverberation energy by $$|\hat{R}_\mu(k)|^2 = |Y_\mu(k-D)|^2 A_\mu e^{-\gamma_\mu D} + |\hat{R}_\mu(k-1)|^2 e^{-\gamma_\mu} \quad (15)$$

The delay D is a fixed parameter. The parameters $A_\mu$ and $\gamma_\mu$ have to be identified for the specific environment.

In the above described model, the parameter A is calculated, whereas, as will be explained further below, for the model of the present invention, $\gamma_\mu$ is considered to be known. The present invention is, however, based upon the filtering method known as spectral subtraction, which will now be explained in more detail below.

Spectral subtraction is a frame based method for noise suppression that works on frequency domain signals. The distorted signal is supposed to consist of two uncorrelated signal portions: the desired signal $X_\mu(k)$ and the noise $N_\mu(k)$ $$Y_\mu(k) = X_\mu(k) + N_\mu(k) \quad (16)$$

The spectral subtraction uses real valued coefficients $W_\mu(k)$ to scale the amplitudes of the distorted signal in each frame in order to get an estimate for $X_\mu(k)$ $$\hat{X}_\mu(k) = Y_\mu(k) H_\mu(k) \quad (17)$$

There are different ways to determine the filter as a function of actual signal power and estimated noise power. The most common method is the Wiener filter $$H_\mu(k) = 1 - \frac{\hat{S}_{nn,\mu}(k)}{\hat{S}_{yy,\mu}(k)} \quad (18)$$

where $\hat{S}_{nn,\mu}(k)$ denotes an estimate for the power density spectrum of the noise signal portion and $\hat{S}_{yy,\mu}(k)$ denotes an estimate for the power density spectrum of the distorted signal. Whereas $\hat{S}_{yy,\mu}(k)$ can be determined directly from the input signal it is mostly difficult to estimate the noise power density spectrum $\hat{S}_{nn,\mu}(k)$. Further details on spectral subtraction can be found in E. Hansler, G. Schmidt: *Acoustic echo and noise control: a practical approach*. John Wiley & Sons, Hoboken N.J. (USA), 2004.

The spectral subtraction method is applied to the problem of dereverberation by assigning the late reverberation portion of the microphone signal from equation (15) as noise portion:

$$\hat{S}_{nn,\mu}(k) = |\hat{R}_\mu(k)|^2 \quad (19)$$

$$\hat{S}_{yy,\mu}(k) = |Y_\mu(k)|^2 \quad (20)$$

It is assumed that the reverberation signal portion R(k) and the desired signal portion X(k) are uncorrelated which is only approximately true for large values of D:

$$H_\mu(k) = 1 - \frac{|\hat{R}_\mu(k)|^2}{|Y_\mu(k)|^2} \quad (21)$$

The present invention relates to the estimation of the parameter $A_\mu$. The parameter $\gamma_\mu$ is a parameter that can be calculated using a method as described in EP 06 016 029.8 filed by the same applicant, the entirety of which is incorporated in this application by reference. For the calculation of $\beta_\mu$, reference is made to EP 06 016 029.8. The method for calculating the parameter A is described in more detail below.

Figure 4:
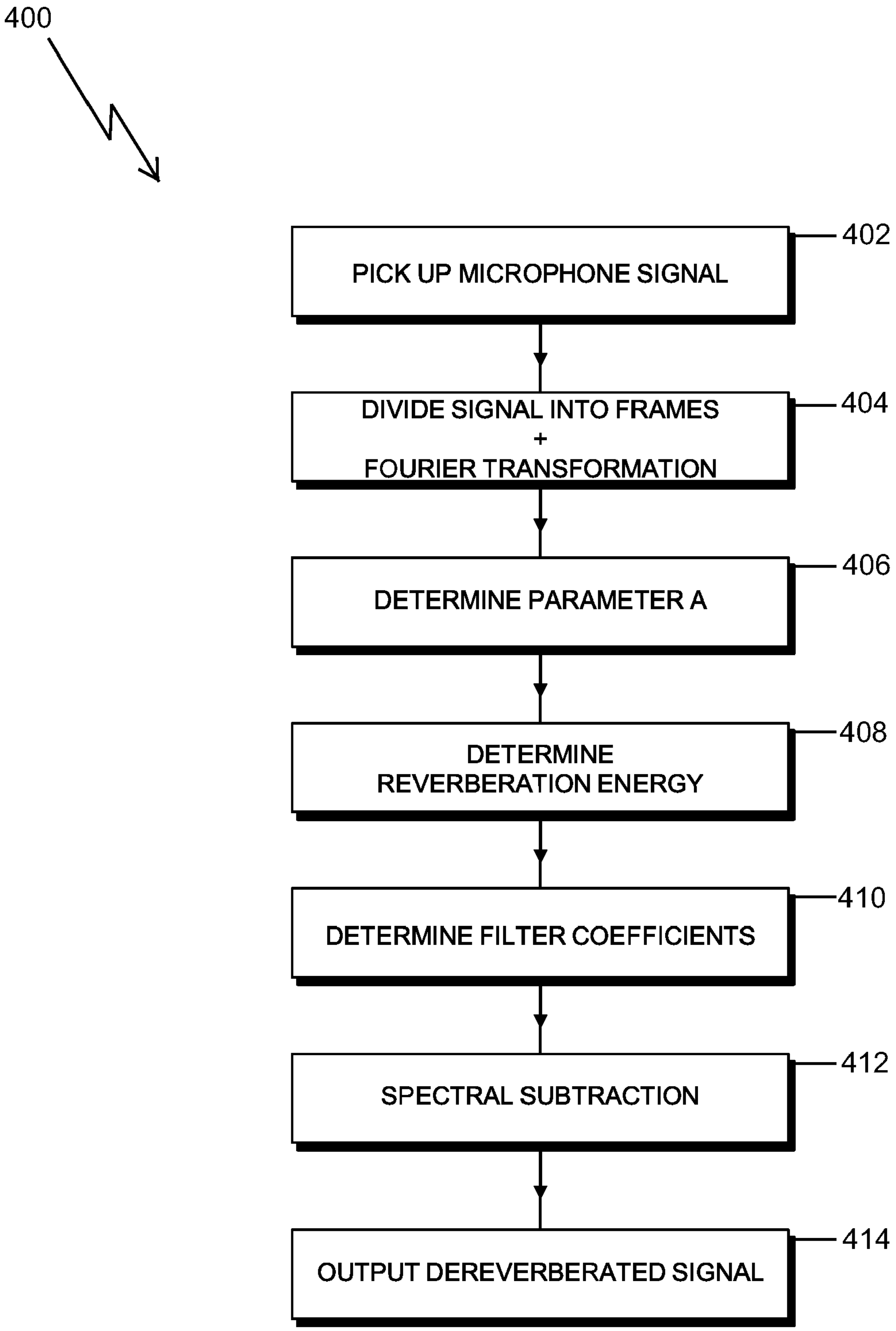
FIG. 4 is a flow chart showing one example of an implementation of basic steps for a method for dereverberation of an acoustic signal detected by a microphone.

FIG. 4 is a flow chart 400 showing one example of an implementation of basic steps for a method for dereverberation of an acoustic signal detected by a microphone. In step 402, the acoustic signal detected by the microphone 106 is detected. In an additional step 404, the microphone signal is divided into frames after analogue to digital signal conversion and the different frames are transferred in the frequency domain by a Fourier transformation. The time domain signal is undersampled in such a way that e.g., 256 sampling values are contained in one sampling frame in the time domain. The next sampling frame in the time domain may overlap the first frame by offsetting the frame by $N_v$ sampling values. In one example implementation of the invention, $N_v$ may be selected as being 64. After dividing the time domain signal into a frame and Fourier transformation in step 404, the transform signal $Y_\mu(k)$ is obtained for each frame. In the step 406, the parameter A is determined by first calculating an incorrect reverberation signal energy as will be explained in further detail in connection with FIG. 5 further below.

In step 408, the reverberation energy is determined, the reverberation energy being used for determining the filter coefficients $H_\mu(k)$ as mentioned above in connection with equation (21) (step 410).

When the filter coefficients are known for each frame in the frequency domain, the spectra microphone signal $Y_\mu(k)$ can be filtered using the spectral subtraction method mentioned above (step 412). The dereverberated signal in the frequency domain may then be retransformed in the time domain by an inverse Fourier transformation. A may then be output as dereverberated signal (step 414). The dereverberated signal can be used as an input signal for a speech recognition system or a hands-free telephony system, or it can be output directly via a loudspeaker.

Figure 5:
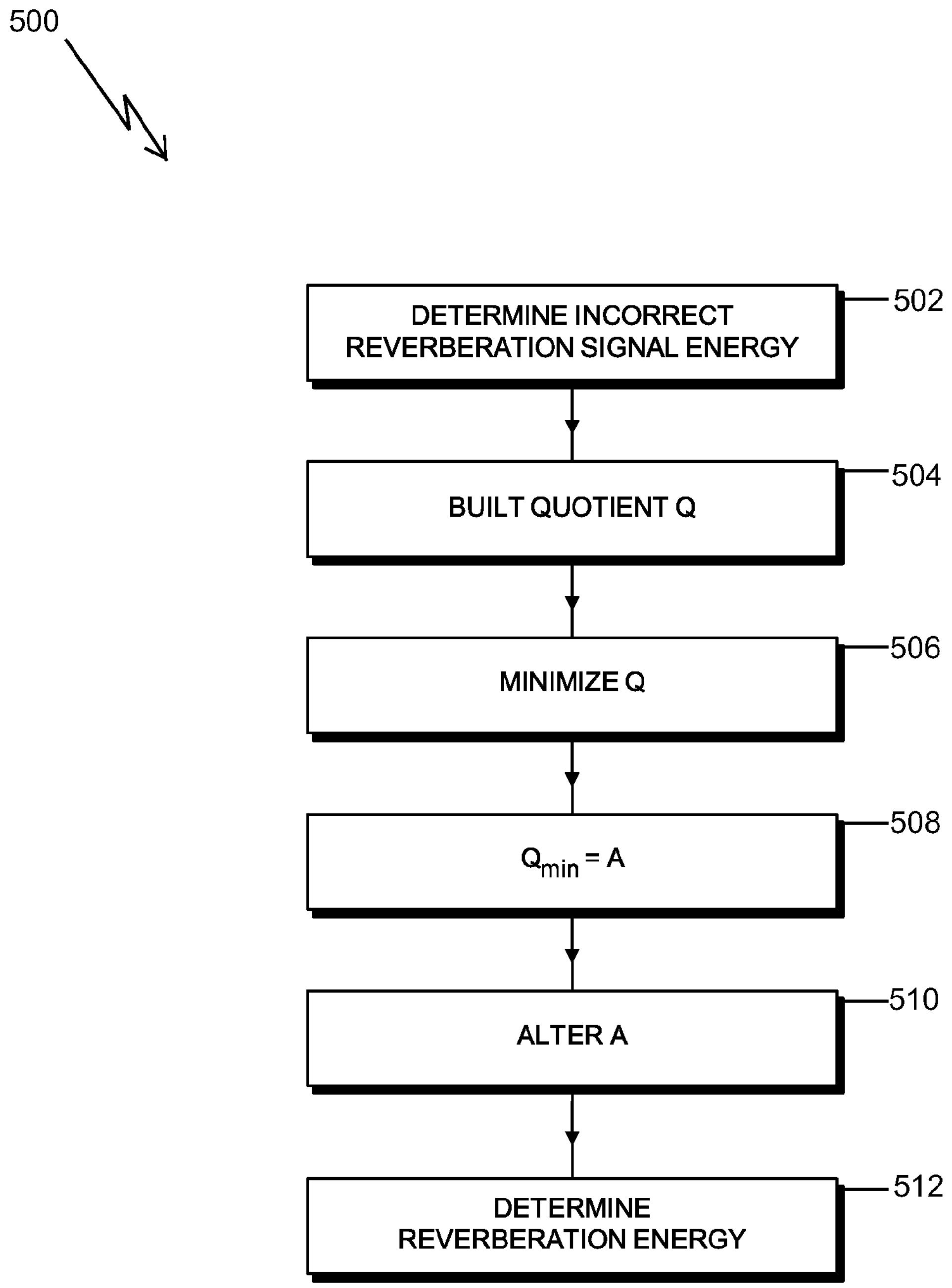
FIG. 5 is a flow chart showing more detailed dereverberation steps of the method of FIG. 4.

FIG. 5 is a flow chart 500 showing more detailed dereverberation steps of the method of FIG. 4. In connection with FIG. 5, the determination of the parameter A is discussed in more detail. For the calculation, it is first of all supposed that the detected signal includes the direct sound signal component and the reverberation component and no noise component. Accordingly, the microphone signal in the frequency domain reads as follows:

$$Y_\mu(k) = X_\mu(k) + R_\mu(k) \quad (22)$$

In the following, the parameter $A_\mu$ has to be determined with a known parameter $\gamma_\mu$. As can be seen from equation (15)

above, the reverberation energy can be calculated based on the delayed signal spectrum and the estimated reverberation energy estimated in an earlier step of the recursive estimation method. An incorrect reverberation signal energy is calculated by simply setting the parameter $A_\mu$ in equation (15) to 1.

$$|\tilde{R}_\mu(k)|^2=|Y_\mu(k-D)|^2+|\tilde{R}_\mu(k-1)|^2e^{-\gamma_\mu} \quad (23)$$

When the parameter $A_\mu$ is set to 1, it is assumed that the direct sound component equals the reverberation signal component (step 502). This temporary reverberation signal energy can now be calculated without the knowledge of the parameter $A_\mu$ to be determined. The correct reverberation signal energy $\hat{R}_\mu(k)^2$ and the temporary incorrect reverberation signal energy $\tilde{R}_\mu(k)^2$ depend from each other by the factor $A_\mu$:

$$|\tilde{R}_\mu(k)|^2=A_\mu\cdot|\tilde{R}_\mu(k)|^2 \quad (24)$$

In the next step 504, a quotient Q is determined as follows:

$$Q_{A,\mu}(k)=1-\frac{|Y_\mu(k)|^2}{|\tilde{R}_\mu(k)|^2} \quad (25)$$

Taking into account above equation 22, the following can be deduced:

$$Q_{A,\mu}(k)=\frac{|X_\mu(k)+R_\mu(k)|^2}{|\tilde{R}_\mu(k)|^2} \quad (26)$$

The parameter $A_\mu$ now should be determined in such a way that $R_\mu(k)^2=\hat{R}_\mu(k)^2$ resulting in:

$$|R_\mu(k)|^2=A_\mu\cdot|\tilde{R}_\mu(k)|^2 \quad (27)$$

Equation (26) can now be formulated differently by $$Q_{A,\mu}(k)=A_\mu\cdot\frac{|X_\mu(k)+R_\mu(k)|^2}{|R_\mu(k)|^2} \quad (28)$$

The last fractional term is ≧1 and becomes 1 if $X_\mu(k)=0$ and $R_\mu(k)^2>0$. This means that the quotient of direct sound energy and reverberation energy becomes 0.

$$\frac{|X_\mu(k)|^2}{|\tilde{R}_\mu(k)|^2}=0 \quad (29)$$

This situation may occur when the acoustic signal abruptly stops after the utterance so that the microphone signal only contains the reverberation component. In this case, there is no direct sound energy in the signal. From this, it can be followed $$Q_{A,\mu}(k)\Big|_{\frac{|X_\mu(k)|^2}{|R_\mu(k)|^2}=0}=A_\mu \quad (30)$$

For all the other cases with $$\frac{X_\mu^2}{R_\mu^2}>0$$

values of $Q>A_\mu$ are obtained. Accordingly, with the above-described method, it is not necessary to precisely detect the speech activity of the user to detect the speech pauses that would be necessary for precisely determining $A_\mu$. As shown in step 506, it is enough to simply minimize the quotient Q:

$$\min_k\{Q_{A,\mu}(k)\}=A_\mu \quad (31)$$

The minimum value of Q is the needed parameter A indicating the ratio of the direct sound signal to the reverberation sound signal.

Once the parameter A is determined, one should bare in mind that the parameter A may not be constant as the speaking person 102 may move relative to the detecting microphone 106. As a consequence, the parameter A has to be determined continuously. To detect the situation, when the speaker 102 approaches the microphone 106 resulting in an increased minimum value A, it might be desirable to slowly increase the calculated value A over time. This can be achieved by multiplying the value A with a predetermined factor α that may be selected slightly greater than 1 (e.g., α=1.001). However, it should be appreciated that any other value of α larger than 1 could be used.

$$\hat{A}_\mu(k)=\min\{Q_{A,\mu}(k),\alpha\cdot\hat{A}_\mu(k-1)\} \quad (32)$$

When the parameter $A_\mu$ is known, the reverberation energy can be determined in step 512 so that it is then possible as described in connection with FIG. 4 to determine the filter coefficients and to filter the microphone signal.

If larger speech pauses are present in the dialog, it may happen that the parameter A increases too much when $A_\mu$ is continuously multiplied by α. If the person 102 starts to speak again, the value of $A_\mu(k)$ should be calculated again. To avoid $A_\mu$ getting too large, a speech detecting unit may be used that initiates the minimization of Q when speech is detected (β=1) and that keeps the last calculated value α when no speech is detected at all over a longer predetermined amount of time (β=0). Mathematically, this means the following:

$$\hat{A}_\mu(k)=\begin{cases}\min\{Q_{A,\mu}(k),\ \alpha\cdot\hat{A}_\mu(k-1)\} & \text{for } \beta=1\\ \hat{A}_\mu(k-1) & \text{for } \beta=0\end{cases} \quad (33)$$

For the speech detection, a course speech detection is sufficient, the detection of pauses between different words of a sentence need not to be detected.

Last but not least the correct reverberation signal energy is calculated using the following equation:

$$|\hat{R}_\mu(k)|^2=\hat{A}_\mu(k)\cdot|\tilde{R}_\mu(k)|^2 \quad (34)$$

In smaller speech pauses existing during the utterance of different words or existing even between two syllables or phonemes of a word, the parameter A could theoretically be determined. By minimizing the quotient Q during the utterance of the speaking person is detected, the parameter A can be determined in an easy way without the need to detect the short speech pauses.

The above-discussed method for attenuating reverberation was made under the assumption that the signal contained no noise. However, noise components often arise in connection with speech dialog systems, especially in a vehicle environment. If an additional noise component is present, the microphone signal can be written as follows:

$$Y_\mu(k)=X_\mu(k)+R_\mu(k)+N_\mu(k) \quad (35)$$

In such a situation, the noise suppression and the reverberation suppression would be necessary. In a first alternative, it is possible to calculate on the basis of $Y_\mu(k)$ two separate signal energies, the reverberation signal energy and the noise signal energy $|\hat{R}|^2$ and $|\hat{N}|^2$. These two values can then be added to be combined to a resulting perturbation energy. This resulting perturbation energy is used for calculating a common filter characteristic. In this case however, the reverberation signal energy is calculated based on a noisy input signal and the noise signal energy is calculated based on a reverberation input signal.

In another example of an implementation, it is possible to carry out a spectral subtraction for each of the two energy values, meaning that noise filter coefficient $H_N(k)$ and reverberation coefficient $H_R(k)$ are calculated. This alternative allows for different filter characteristics to be utilized for noise and reverberation respectively. The combination of the filters can be done by searching the minimum:

$$H_{Ges,\mu}(k)=\min\{H_{R,\mu}(k), H_{N,\mu}(k)\} \quad (36)$$

or by multiplication in the following way:

$$H_{Ges,\mu}(k)=\max\{\alpha_{SPS}, H_{R,\mu}(k)\cdot H_{N,\mu}(k)\} \quad (37)$$

$\alpha_{SPS}$ indicates the so-called spectral floor.

For the suppression of noise and reverberation, the two different energies have been estimated separately.

Figure 6:
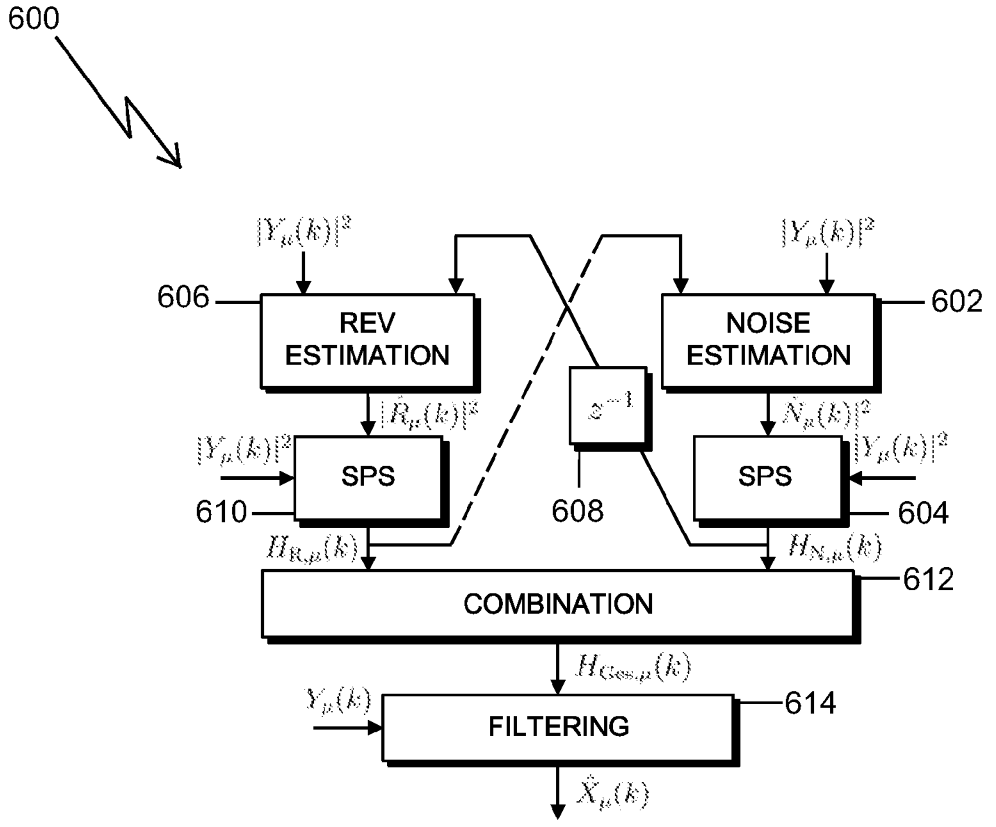
FIG. 6 is a schematic diagram of one example of a system for carrying out noise reduction and dereverberation.

FIG. 6 is a schematic diagram of one example of a system 600 for carrying out noise reduction and dereverberation. In FIG. 6, a system is shown using a noise reduction and a separate reverberation reduction. In the right branch of FIG. 6, the noise reduction is shown, whereas the reverberation reduction is shown in the left branch. The energy of the spectrum of the microphone signal is used as an input for the noise estimation unit 602. From the noise estimation, a noise signal energy can be calculated ($|\hat{N}_\mu(k)|^2$) that is transmitted to the spectral subtraction unit ("SPS") 604. The microphone signal $|Y(k)|^2$ is also used as an input for SPS 604 and the noise filter coefficient $H_N(k)$ are calculated.

As can be seen on the left side, the spectrum of the microphone signal is in the reverberation estimation unit 606, where the reverberation signal energy $|\hat{R}(k)|^2$ is calculated. For estimating the reverberation energy, it is possible to already use the noise reduced signal $Y(k)\cdot H_N(k)$. As an alternative, it is possible to use a reverberation reduced signal $Y(k)\cdot H_R(k)$ as an input signal for the noise reduction. Doing both at the same time is hardly possible as the reverberation filter would be based on a noise reduced signal where the filter used for the noise reduction would be based on a dereverberated signal, that needed to be filtered with a filter to be calculated. This problem can, however, be overcome by utilizing the system of FIG. 6. The noise reduced signal is delayed by delay element 608. This delay does not cause a problem for the reverberation estimation as the estimation of the reverberation energy delayed by D cycles is utilized for the estimation:

$$|\hat{R}_\mu(k)|^2=|Y_\mu(k-D)H_{N,\mu}(k-D)|^2 A_\mu e^{-\gamma_\mu D}+|\hat{R}_\mu(k-1)^2 e^{-\gamma_\mu} \quad (38)$$

In a dashed line shown in FIG. 6, one example of an implementation is shown where the dereverberated signal is utilized for the noise reduction. Once the reverberation energy is estimated on the basis of the noise reduced signal, the reverberation signal energy is transmitted to the spectral subtraction unit (SPS) 610 resulting in the reverberation filter coefficient $H_R(k)$. In the combination unit 612, the two filter coefficients are combined to $H_{Ges}(k)$. Once the resulting filter coefficients $H_{Ges}(k)$ are known, the spectrum of the detected microphone signal $Y_\mu(k)$ can be filtered in filtering unit 614. The result is the direct sound signal $\hat{X}_\mu(k)$.

In one example, the microphone signal my be sampled at a sampling rate of about 11 kHz, sampling frames with a width of 256 samples in the time domain may be utilized for the Fourier transformation and an offset of subsequent sampling frames of 64 samples in the time domain may be utilized. The predetermined factor $\alpha$ for slowly increasing the value of A over time may be set to 1.001.

Figure 7:
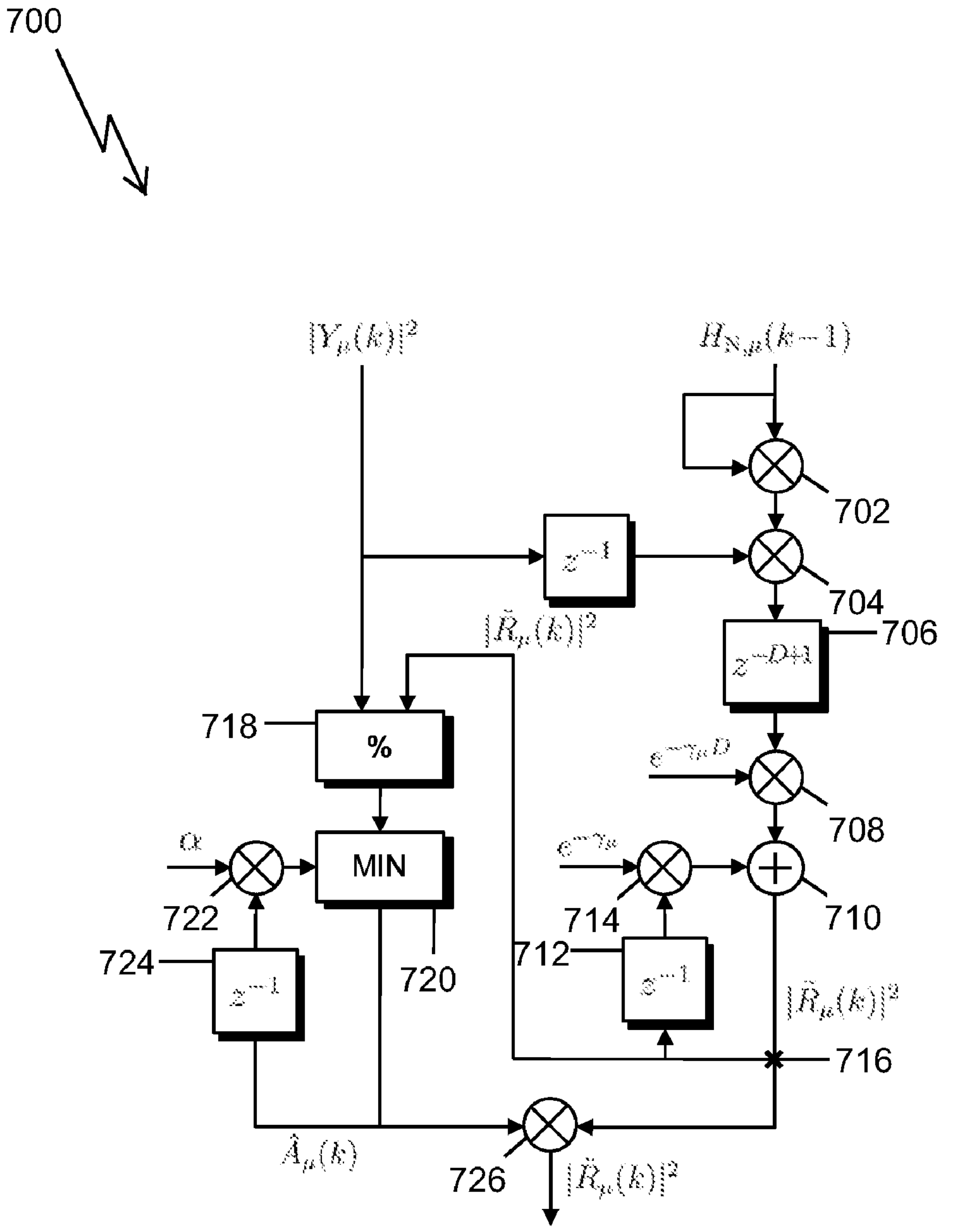
FIG. 7 is a schematic diagram illustrating a detailed example of the dereverberation component shown in FIG. 6.

FIG. 7 is a schematic diagram 700 illustrating a detailed example of the dereverberation component shown in FIG. 6. In FIG. 7, the reverberation estimation unit 606 is shown in more detail. The unit shown in FIG. 7 carries out the estimation of the reverberation energy as discussed in more detail above in connection with FIGS. 4 and 5. As shown in the right branch of FIG. 7, the filter coefficients calculated in an earlier calculation step are squared in unit 702. The spectrum of the microphone signal is retarded and multiplied with the output of unit 702 in unit 704. In the delay element 706, the resulting signal is delayed by D−1 cycles. The result is then multiplied by $e^{-\gamma_\mu D}$ in unit 708 resulting in the first term for calculating the incorrect reverberation energy shown by equation (15). The incorrect reverberation energy $|\tilde{R}_\mu(k)|^2$ delayed by delay element 712 is multiplied by $e^{-\gamma_\mu}$ in unit 714 and added to the output signal of unit 708 in unit 710.

The signal at location 716 corresponds to the signal shown by equation (23). As shown in the left branch of FIG. 7, the ratio Q of the acoustic signal energy $|Y(k)|^2$ and the incorrect reverberation signal energy $|\tilde{R}(k)|^2$ is determined. This ratio is then minimized as symbolically shown by unit 720. The time increment by multiplying the minimized value by $\alpha$ is obtained in unit 722 together with the delay element 724 to arrive at $\hat{A}(k)$ as mentioned in equation (32). With the two input values $\hat{A}_\mu(k)$ and $\tilde{R}_\mu(k)$, the correct reverberation energy can be calculated in unit 726 as also shown by equation (34). The result of the reverberation energy estimation is then, as shown in FIG. 6, used for the spectral subtraction.

Summarizing, the invention provides a method for dereverberation by suppressing the reverberant signal component on the basis of the spectral subtraction where the energy of the reverberant signal component is estimated by a statistical model. A new method for estimating one of the two model parameters, namely the parameter A of the two parameters $\gamma_\mu$ and $A_\mu$ is provided. The invention may be particularly, but not exclusively, applied in hands-free telecommunication systems or automatic speech recognition systems.

As set forth above, a method for estimating a reverberation signal component of the acoustic signal is provided, the acoustic signal containing a direct sound component and the reverberation component. According to the method, the acoustic signal is detected by a microphone 106 and the reverberation signal component is estimated. In this estimation step, an incorrect reverberation signal component $\tilde{R}$ is calculated under the assumption that the reverberation signal component has a predetermined relationship to the direct sound component. In an additional step, the error resulting from this assumption that the reverberation signal component has a predetermined relationship to the direct sound component is minimized. A predetermined relationship may be that the reverberation signal component corresponds to the direct sound component, or that the reverberation signal component and the direction sound component have a predetermined ratio, or that the direct sound signal energy and the reverberation signal energy have a predetermined ratio or the like. Accordingly, a unit for measuring the speech activity and detecting the pauses between the speech in an accurate need not be provided with the present invention. The reverberation signal component can be estimated by calculating an incorrect reverberation signal component and to use this calculation for determining the correct reverberation signal component. Once the reverberation signal component is known, the reverberation signal component can be subtracted from the acoustic signal to attenuate reverberation.

The step of minimizing the error does not mean that the error is determined and minimized in an approximation procedure. The step of minimizing the error should refer to the calculation of the correct reverberation signal component based on the calculation of the incorrect reverberation signal component.

According to one implementation, for estimating the reverberation signal component, a reverberation signal energy $|\hat{R}|^2$ of the reverberation signal component is estimated. In further detail, an incorrect reverberation signal energy $|\tilde{R}|^2$ of the incorrect signal component may be calculated for which the reverberation energy equals a direct sound energy. To be able to carry out the calculation step, the reverberation signal energy is put on a level with the direct sound energy. In a further step, the error resulting from this assumption can be removed by minimizing a quotient Q. The acoustic signal detected by the microphone may be considered being a digital signal, meaning that the electric microphone signal was already subject to an analogue to digital conversion. The sample microphone signal may then be transformed into the frequency domain. The time domain microphone signal may be divided in short time frames, each time frame signal having a predetermined number of sampling values. Each time frame signal can then be fully transformed into the frequency domain resulting in a frame based spectrum for each of the time domain frames. Preferably all the calculation steps discussed may be carried out in the frequency domain.

For calculating the reverberation signal component or its energy, a parameter A may be calculated corresponding to the ratio of the direct sound signal energy to the reverberation signal energy. As mentioned above, for the estimation of the reverberation signal energy the assumption was made that the reverberation signal energy corresponded to the direct sound energy. As A is the ratio of the direct sound signal energy to the reverberation signal energy, A is set to 1 for the calculation of the incorrect reverberation signal component. When the parameter A is set to 1, an incorrect reverberation signal energy $|\tilde{R}|^2$ can be calculated.

According to one example, the reverberation signal energy may be recursively calculated on the basis of a delayed signal spectrum of the acoustic signal and on the basis of the reverberation signal energy calculated in an earlier step of the recursive calculating method. The reverberation signal energy may be regressively estimated by using the following equation:

$$|\hat{R}_\mu(k)|^2 = |Y_\mu(k-D)|^2 A_\mu e^{-\gamma_\mu D} + |\hat{R}_\mu(k-1)|^2 e^{-\gamma_\mu} \quad (15)$$

where $Y_\mu(k)$ is the Fourier transformed microphone signal component, k being the time index of the under sampled signal in the frequency domain, μ indicating the frequency band, D being a predetermined delay, $A_\mu$ corresponding to the parameter A mentioned above, $\hat{R}$ being the (correct) reverberation signal energy, $\gamma_\mu$ being a parameter describing the decay of the reverberation signal energy. The parameter $\gamma_\mu$ mainly depends on the shape and the size of the room in which the microphone signal is detected such as the size of the room or the sound absorption of the boundary walls. The parameter A describes the ratio of the direct sound component and the reverberation component and mainly depends on the position of the speaker uttering the acoustic signal relative to the position of the microphone picking up the acoustic signal.

In one additional step of the calculation of A, a ratio Q is determined indicating the ratio of the acoustic signal energy $|Y(k)|^2$ to the incorrect reverberation signal energy $|\tilde{R}(k)|^2$. According to one aspect of the invention, the minimization of the error comprises the step of minimizing the ratio Q. When the minimum of the ratio Q is determined, the parameter A corresponding to the ratio of the direct signal energy to the reverberation signal energy is found, and as a consequence the reverberation signal energy can be determined. With the reverberation signal energy known, filter coefficients of a digital filter used for filtering the acoustic signal can be determined, the filter being used for dereverberation of the acoustic signal.

The minimization of Q can be interpreted as a solution when the speaker abruptly stops to utter an acoustic signal, the microphone 106 detecting in this case only the reverberation signal components. In a speech signal, speech pauses are followed by speech uttered by the speaking person. Theoretically, when a speech pause is detected, the reverberation signal energy needed for determining the filter coefficient of the filter for filtering the acoustic signal can be calculated. However, to this end, sophisticated speech activation detecting units would be needed accurately detecting when speech is uttered and when no speech is uttered by the user. During a speech pause, the correct value of A could be determined. According to the present invention, speech activity detecting unit necessary to detect the speech pauses may not need to be provided. Mathematically, the speech pauses can be detected when the quotient Q is minimized. When the minimum value of Q is calculated, a value of A is obtained which corresponds to the situation when the user has uttered a sound signal abruptly stopping after the utterance.

The parameter A corresponding to the ratio of the direct signal energy to the reverberation signal energy may be dependent on time as the distance between the user and the microphone need not to be constant. By way of example, when the user is approaching the microphone, the parameter A will increase, whereas the parameter A will decrease when the speaking user moves away from the microphone. As a consequence, the parameter A may be time-dependent and may be therefore calculated continuously over time. When a minimum of the parameter A has been calculated, the parameter may increase again when the user approaches the microphone. To take this situation into account, the parameter A can be slowly incremented over time to be able to detect a new minimum value of A that is larger than the previously determined parameter A.

In the case of longer speech pauses, the parameter A could be increased too much. To avoid the situation, a course speech detector may be used. When a longer pause in the speech is detected, the increment of A may be stopped to avoid that the value of A gets to high resulting in difficulties to again minimize the parameter A during speech.

In another implementation of the invention, when the reverberation signal component is estimated, the acoustic signal can be attenuated by especially attenuating the reverberation signal component. The reverberation signal component may be attenuated utilizing a digital filter, such as Wiener-Filter. The filter coefficients for this Wiener-Filter can be calculated when the acoustic signal energy and the reverberation signal energy is known. As mentioned above, the reverberation signal energy can be calculated by calculating A. When the parameter A is known, the reverberation signal energy can be calculated using the above-mentioned equation (15). The signal energy of the acoustic signal is known from the detected microphone signal.

According to another implementation of the invention, the dereverberation can be carried out by calculating the parameter A, calculating the reverberation signal energy, determining the filter coefficients on the basis of the calculated reverberation signal energy and filtering the acoustic signal using the calculated filter coefficients. The filtering can be carried out for each of the frames of the Fourier transform signal. After filtering the different filtered frames can be retransformed into the time domain and the time domain can be built from the different filtered and Fourier transformed signals. The resulting filtered acoustic signal has less reverberation components, thus facilitating the perceivability of the filtered acoustic signal.

For the calculation of the reverberation signal component the following approximation may be made: The energy of the microphone signal X(k) in the frequency domain is approximated by the energy of the direct sound and the energy of the reverberation signal R(k), $$|Y_\mu(k)|^2 \approx |X_\mu(k)|^2 + |R_\mu(k)|^2 \quad (10)$$

Up to now, the acoustic signal as detected was approximated by having the direct sound (speech) component and the reverberation component. However, the method of the invention is often utilizing in a noisy environment so that the noise component should not be neglected. According to one implementation, the noise component is attenuated in addition to the reverberation component. In the case of a noisy environment the Fourier transformed microphone signal comprises the following components:

$$Y_\mu(k) = X_\mu(k) + R_\mu(k) + N_\mu(k) \quad (35)$$

$Y_\mu(k)$ being the microphone signal, $X_\mu(k)$ being the direct sound component, $R_\mu(k)$ being the reverberation signal component and $N_\mu(k)$ being the noise component.

In one implementation of the invention, it is possible to determine a noise energy and a reverberation energy and to combine the two to a resulting perturbation energy. Based on this resulting perturbation energy, filter coefficients are determined for one filter having a combined filter characteristic.

In another implementation of the invention, the noise energy and the reverberation energy are determined and noise filter coefficients are calculated on the basis of the estimated noise energy and reverberation filter coefficients are calculated on the basis of the estimated reverberation energy. The acoustic signal is then filtered using the noise filter coefficients and the reverberation filter coefficients. In this situation, it is now possible to use a noise reduced signal as a basis for the estimation of the reverberation energy, the noise reduced signal being filtered using the noise filter coefficients. On the other hand, it is also possible to use a reverberation reduced signal for estimating the noise energy, the reverberation reduced signal being a signal which was filtered using the reverberation filter coefficients. As both filterings cannot be carried out at the same time using the other filter coefficients, one of the signals may be delayed before it is used for estimating the other signal energy. By way of example, the noise-reduced signal may be calculated using the noise filter coefficients, and the noise reduced signal is delayed before it is transmitted to the reverberation filter. The delay of the noise reduced signal is not a problem for the reverberation estimation, as can be seen from equation (15), a signal is utilized that was delayed by D cycles.

It will be understood, and is appreciated by persons skilled in the art, that one or more processes, sub-processes, or process steps described in connection with FIGS. 1-7 may be performed by hardware and/or software. If the process is performed by software, the software may reside in software memory (not shown) in a suitable electronic processing component or system such as, one or more of the functional components or modules schematically depicted in FIGS. 1-8. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, propagate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Accordingly, software may be provided in the form of a computer program that may be loaded into the internal memory of a computer, where the software includes programs for performing any of the above described methods. The computer program can be provided on a data carrier, and may be executed using a microprocessor of a computer. An electronically readable data carrier may further be provided with stored electronically readable control information configured such that when using the data carrier in a computer system, the control information performs one of the above-mentioned methods.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for estimating a reverberation signal component of an acoustic signal detected by a microphone, the acoustic signal comprising a direct sound component and the reverberation signal component, the method comprising the following steps:

detecting the acoustic signal;

estimating the reverberation signal component, where the estimating step comprises the step of:

calculating an incorrect reverberation signal component $\tilde{R}$ under the assumption that the reverberation signal component has a predetermined relationship to the direct sound component; and minimizing the error resulting from the assumption that the reverberation signal component has a predetermined relationship to the direct sound component so as to estimate the reverberation signal component.

2. The method of claim 1, where for estimating the reverberation signal component a reverberation signal energy $|\hat{R}|^2$ of the reverberation signal component is estimated.

3. The method of claim 2, further comprising the step of calculating an incorrect reverberation signal energy $|\tilde{R}(k)|^2$ of the incorrect signal component $\tilde{R}$ for which the reverberation signal energy equals a direct sound energy $|X(k)|^2$.

4. The method of claim 1, further comprising the step of calculating a parameter A corresponding to a ratio of the direct sound signal energy to the reverberation signal energy, where A is set to 1 for the calculation of the incorrect reverberation signal component.

5. The method of claim 2, where the reverberation signal energy $|\hat{R}(k)|^2$ is recursively calculated on the basis of an delayed signal spectrum of the acoustic signal and on the basis of the reverberation signal energy calculated in an earlier step of the recursive calculation method.

6. The method of claim 3, where the minimizing step comprises the step of determining a ratio Q of an acoustic signal energy $|Y(k)|^2$ to the incorrect reverberation signal energy $|\tilde{R}(k)|^2$.

7. The method of claim 6, where the step of minimizing the error comprises the step of minimizing the ratio Q.

8. The method of claim 7, where when the ratio Q is minimized the parameter A corresponding to the ratio of the direct signal energy to the reverberation signal energy is determined.

9. The method of claim 4, where the parameter A is time dependent and calculated continuously.

10. The method of claim 9, where the calculated parameter A is incremented over time.

11. The method of claim 10, further comprising the step of determining pauses in which no acoustic signal is detected over a predetermined amount of time, where when a pause is detected the increment of A is stopped.

12. The method of claim 1, where the acoustic signal, after detection is transformed into a frequency domain where the estimation of the reverberation signal component is carried out.

13. The method of claim 2, where the reverberation signal energy is recursively estimated according to the following equation:

$$|\hat{R}_\mu(k)|^2=|Y_\mu(k-D)|^2 A_\mu e^{-\gamma_\mu D}+|\hat{R}_\mu(k-1)|^2 e^{-\gamma_\mu}.$$

14. The method of claim 4, further comprising the step of calculating filter coefficients of a digital filter on the basis of the reverberation signal energy and on the basis of the acoustic signal energy.

* * * * *